United States Patent Office 3,244,669
Patented Apr. 5, 1966

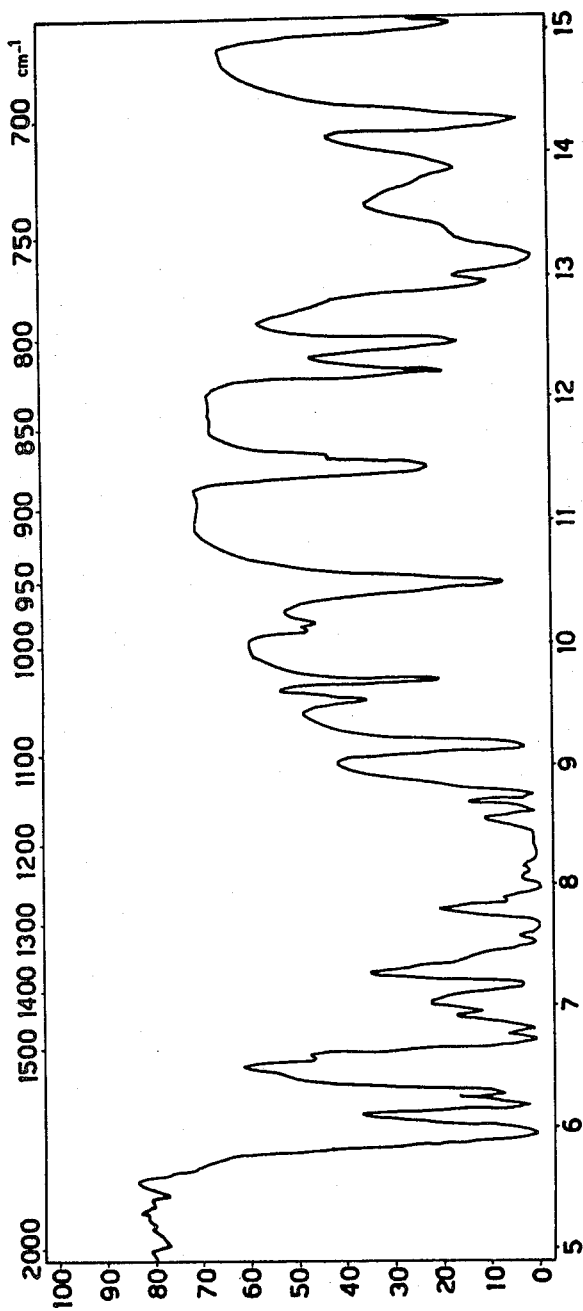

3,244,669
POLYPROPYLENE STABILIZED WITH DISALICYL THIODIGLYCOL
Cornelio Caldo and Salvatore Algieri, Terni, Italy, assignors to Montecatini Società Generale per l'Industria Mineraria e Chimica, Milan, Italy, a corporation of Italy
Filed Sept. 11, 1962, Ser. No. 222,905
Claims priority, application Italy, Sept. 14, 1961, 16,547/61
3 Claims. (Cl. 260—45.85)

The present invention relates to the preparation of aromatic thioesters and their use in the stabilization of polyolefins.

In U.S. Patent No. 3,236,805 there is described the synthesis of thioesters having the formula:

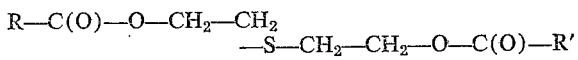

wherein R and R' are aliphatic groups containing from 8 to 30 carbon atoms. There is also described the use of such thioesters in the stabilization of crystalline polyolefins, prepared in the presence of certain stereo specific catalysts.

S. Moore and other authors, have described (J. Org. Chem. 11, 675–80, 1946) the synthesis of the disalycilthiodiglycol:

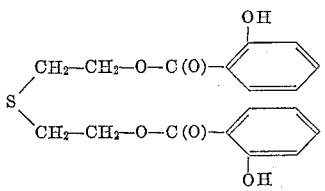

by reaction of $\beta,\beta'$-thiodiethyl chloride with sodium salycilate.

We have now found that compounds of the formula:

(1)    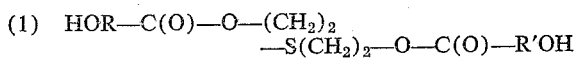

wherein R and R' are an aryl nucleus, can be obtained by the reaction of thiodiethyleneglycol with two moles of an aromatic oxyacid according to the disclosure in the aforesaid U.S. Patent No. 3,236,805. Compounds defined by the above Formula 1, and particularly disalycilthiodiglycol, exhibit a good stabilizing action for polyolefins against heat, ageing and light, particularly as regards polypropylene prepared in the presence of certain stereospecific catalysts. Such compounds of the Formula 1 can also be used to stabilize a mixture of a polyolefin and another compound containing nitrogen, such as (e.g., polyalkyleneimines, condensation products of dichloroethane with polyfunctional amines, condensation products of epichlorohydrin with amines, polyvinylpyridine, etc.) which compositions give textile fibers having improved tinctorial characteristics.

To further describe our invention, we include FIGURE 1, which shows the infra red spectrum of disalycilthiodiglycol. On the abscissae the wave lengths expressed in $\mu$ are plotted whilst the transmittances are plotted on the ordinate.

A compound of the general Formula 1 is added, in accordance with the present invention, to the polyolefin to be stabilized in an amount of from about 0.02 and 2% by weight of the polyolefin.

The following examples illustrate the synthesis of a compound of the general Formula 1 and demonstrate the use of such a compound in the stabilization of polyolefins.

Example 1

800 ml. toluene, 276 g. salycilic acid (2 moles) and 122.19 g. (1 mole) thiodiethyleneglycol are introduced into a 2 liter flask.

The mixture is heated under reflux in an apparatus which enables one to remove the water formed in the reaction, e.g., a Markusson apparatus, thus permitting a complete conversion of acid and thioalcohol into thioester.

After removing 9 cc. water, 0.5 g. p-toluenesulphonic acid are added.

The heating is continued until 36 ml. water (2 moles) have been removed (this occurs in about 20 hours). A great part of the toluene distills off under normal pressure, and then the remainder is distilled off under reduced pressure (residual pressure 20–30 mm. Hg). The disalycil thiodiglycol thus formed (348 g.) is crystallized from ethyl alcohol. It is in the form of white crystals having a melting point of 75–76° C.

Analysis has given the following results:

Calculated for $C_{18}H_{18}O_6S$: C=59.6%  H=4.9%; S=8.83%.

Found for $C_{18}H_{18}O_6S$: C=59.2%; H=4.3%; S=9.08%.

The molecular weight determined by the ebullioscopic method in benzene is 359, whilst the calculated molecular weight is 362.

The saponification number found is 305; calculated=310.

Examples 2 and 3

In Examples 2 and 3, tests of thermal degradation (a), stability against the thermal accelerated ageing (b), and stability to sun light (c) are reported for a composition to which a stabilizer has been added according to the present invention (Example 2) and for an unstabilized control (Example 3).

|  | Ex. 2 | Ex. 3 |
|---|---|---|
| Composition of the mixture: | | |
| (a) Polypropylene—[$\eta$] (Intrinsic viscosity as measured in tetrahydronaphthalene at 135° C.) | 1.6 | 1.6 |
| Ash, percent | 0.029 | 0.029 |
| Residue after boiling heptane extraction, percent | 94.4 | 94.4 |
| (b) Disalycil thiodiglycol, percent | 0.5 | -------- |
| Technology of the mixer | (¹) | (¹) |
| Melt of the mixture in a glass tube at 250° C. for 10 minutes: Color | Clear | Clear |
| Spinning conditions: | | |
| Screw feeder temp., °C | 230 | 230 |
| Extrusion head temp., °C | 250 | 250 |
| Spinneret temp., °C | 250 | 250 |
| Type of the spinneret | 60/0.8×16 | 60/0.8×16 |
| Maximum pressure, kg./cm.² | 60 | 65 |
| Winding rate, meters/min | 400 | 400 |
| Drawing conditions: | | |
| Temp., degrees | 125 | 125 |
| Medium | Steam | Steam |
| Stretching ratio | 1:5 | 1:5 |
| Characteristics of the drawing yarn: | | |
| Tenacity, g./den | 5.75 | 5.55 |
| Elongation, percent | 26 | 24 |
| (a) Thermal degradation: Percent lowering of [$\eta$] in extrusion | 71 | 69 |
| (b) Stability of the thermal accelerated ageing: Residual tenacity, percent after exposition at 120° C. in an oven provided with air circulation for 15 hours | 72 | Brittle |
| (c) Stability to sun light: Residual tenacity, percent after exposition to summer sun for 290 hours of effective exposure | 49 | 29 |

¹ Henshel mixer.

The crystalline polyolefins described herein are well known and consist prevailingly (over 50%) of isotactic macromolecules.

Variations can of course be made without departing from the spirit of our invention.

Having thus described our invention, what we desire to secure and hereby claim by Letters Patent is:

1. A composition stabilized against the action of heat, ageing, and light, said composition comprising crystalline polypropylene consisting for over 50% of isotactic macromolecules and from about 0.02 to 2% by weight of said polypropylene of disalicyl thiodiglycol.
2. The composition of claim 1 in filamentary form.
3. The composition of claim 1 in film form.

References Cited by the Examiner

UNITED STATES PATENTS

| | | | |
|---|---|---|---|
| 2,732,366 | 1/1956 | Tubbs et al. | 260—45.8 |
| 2,891,090 | 6/1959 | Campbell et al. | 260—474 |
| 2,918,491 | 12/1959 | Radue | 260—474 |
| 3,022,268 | 2/1962 | Armitage et al. | 260—45.85 |

LEON J. BERCOVITZ, *Primary Examiner.*

DONALD E. CZAJA, *Examiner.*